Aug. 25, 1959 F. W. BROWN 2,901,610

CONTROLLABLE VOLTAGE INTEGRATION CIRCUIT

Filed Jan. 31, 1957 2 Sheets-Sheet 1

INVENTOR.
FORREST W. BROWN

BY

Ervin B. Steinberg
agent

Aug. 25, 1959 F. W. BROWN 2,901,610

CONTROLLABLE VOLTAGE INTEGRATION CIRCUIT

Filed Jan. 31, 1957 2 Sheets-Sheet 2

INVENTOR.
FORREST W. BROWN

BY

Ervin B. Steinberg
agent.

United States Patent Office 2,901,610

Patented Aug. 25, 1959

2,901,610

CONTROLLABLE VOLTAGE INTEGRATION CIRCUIT

Forrest W. Brown, New Canaan, Conn., assignor to The Reflectone Corporation, Stamford, Conn., a corporation of Connecticut Application January 31, 1957, Serial No. 637,526

5 Claims. (Cl. 250—27)

This invention refers to a resistance-capacitance type integrating circuit and has particular reference to an integration circuit in which the rate of change of a voltage can be controlled within very wide limits. In particular, the invention describes an electrical circuit comprising a capacitor-resistance network wherein the rate of rise or decline of a voltage can be obtained at a constant value and over a wide range.

Integrating circuits using R-C networks are well known in the electronic art. Such circuits are used for many purposes including for analog computing devices. It is well known that the ordinary R-C circuit shows when plotting voltage against time, an exponential rise or decline of the voltage curve. In order to obtain high accuracy only a small portion of the total curve is useable since the greatest rate of change occurs only within the limits of about one time constant. This limitation quite often acts as a severe restriction especially when considering the fact that even within this period of one time constant the rate of change is exponential and not linear.

One of the objects of this invention therefore is the provision of an integration circuit which overcomes one or more of the limitations of the prior art devices.

Another object of this invention is the provision of an integration circuit which provides a linear rate of change of voltage over a very wide range.

Another object of this invention is to provide a linear rate of change of voltage over an extended voltage range, the rate being variable from a positive to a negative, or from a negative to a positive value.

Another and further object of this invention is the provision of a voltage integration circuit which produces an adjustable and linear rate of change of voltage and which employs a minimum number of components.

Another and still further object of this invention is to provide a controllable voltage integration circuit which employs a capacitor-resistance network in combination with a cathode follower circuit.

Still further and other objects of the invention will be apparent by reference to the following description taken in conjunction with the accompanying drawings in which.

Figure 1:
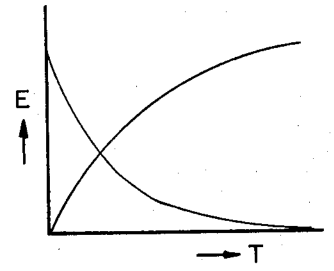
Figure 1 is a graph showing the action of the conventional integrating circuit.

Referring now to Figure 1, a graph is shown which illustrates the rate of voltage change using the conventional R-C integration circuit. It is well known that the curve for rise or decline of the voltage follows the exponental equation:

$$e_C = E(1 - \epsilon^{-t/T})$$

wherein $e_C$=voltage of capacitor $E$=supply voltage $\epsilon$=2.71828

$T$=time constant (product of resistance and capacitance)

$t$=time

Figure 2:
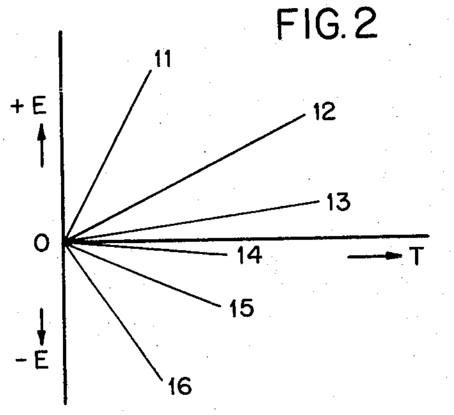
Figure 2 is a graph showing various rates of change which can be selected by using the present invention.

Figure 2 shows the linear rate of change which can be obtained by the use of the circuit described in this application. Numerals 11, 12 and 13 illustrate typical rates of change in a positive direction whereas numerals 14, 15 and 16 indicate negative rates of change of voltage. It will be apparent that numerals 13 and 14 indicate relatively small values of rates of change whereas numerals 11 and 16 indicate larger values of rates of change.

Figure 3:
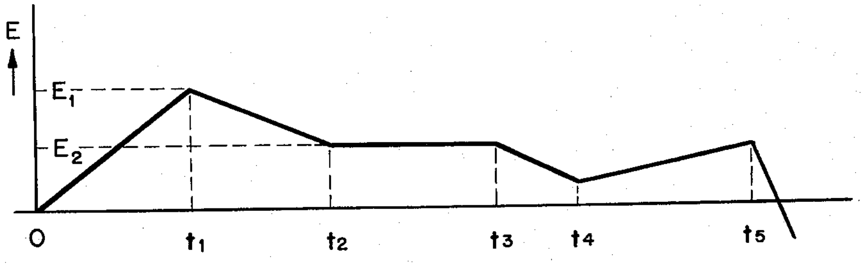
Figure 3 is a curve illustrating typical rates of change which may be adjusted in a continuing problem.

Figure 3 illustrates a typical problem which may be employed in an analog computing device wherein the rates of change are varied over a period of time. Between the starting point and time interval $t_1$ a positive rate of change is employed thereby obtaining a final voltage value $E_1$. Between interval $t_1$ and $t_2$ a negative rate of change is adjusted thereby reducing the voltage to value $E_2$. Between $t_2$ and $t_3$ the rate of change has a zero value, from $t_3$ to $t_4$ the rate of change is negative, from $t_4$ to $t_5$ the rate of change is slightly positive and similarly, starting at $t_5$ a negative rate of change occurs which brings the voltage E to a negative value.

Figure 4:
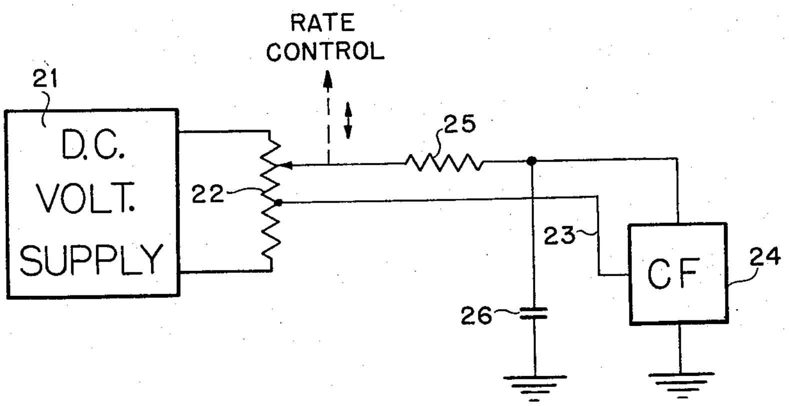
Figure 4 is a schematic circuit diagram, partly in block form, of the circuit elements employed for the integration circuit.

The principle of the circuit employed is shown in Figure 4 wherein numeral 21 identifies a D.-C. voltage supply. A variable resistor 22 having a slidable contact and a center tap is connected across the output terminals of the D.-C. supply. The center tap of the resistor 22 is connected via conductor 23 to a cathode follower circuit 24, and the slidable contact of the resistor is connected serially with a resistor 25 which has a relatively high value (usually several megohms) to the cathode follower 24. A capacitor 26 is connected between ground potential and in series with resistor 25 to the slidable contact of the variable resistor 22. Capacitor 26 and resistor 25 form a conventional R-C network. By moving the slidable contact of the resistor 22 relative to the end positions of this resistor, varying rates of change of voltage can be taken from the cathode follower circuit. These rates of change will be linear as will become apparent in the description hereafter. As the slidable contact of the resistor traverses the center tap, the rates of change of voltage will change from a positive to a negative value or vice versa.

Figure 5:
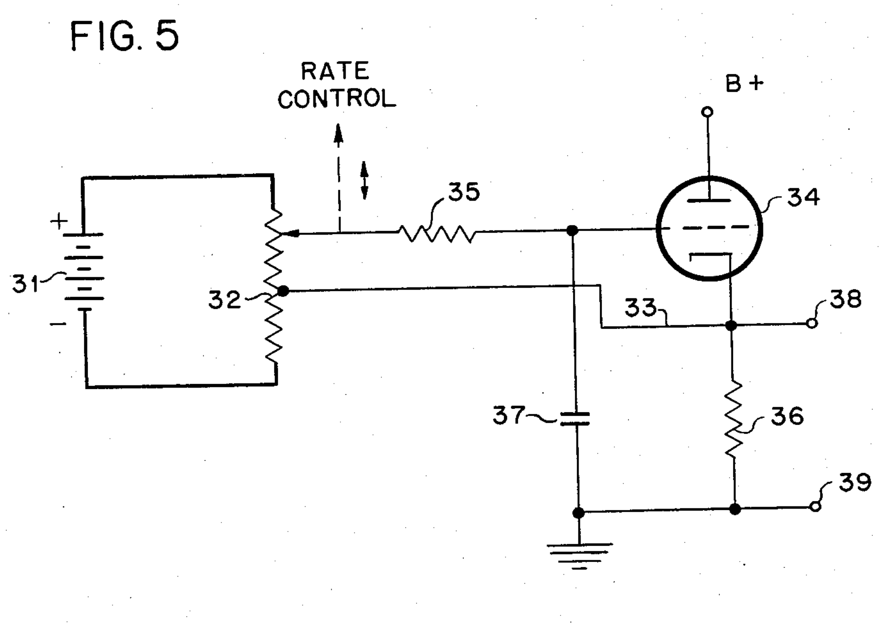
Figure 5 is a schematic circuit diagram of the basic integration circuit.

Figure 5 shows the basic integration circuit which includes a source of D.-C. potential, battery 31, connected to variable resistor 32. The center tap of the variable resistor 32, sometimes called "potentiometer," is connected via conductor 33 to the cathode of electron tube 34 which with its associated circuit elements forms a cathode follower circuit. The control electrode of tube 34 is connected via resistor 35 to the slidable contact of the variable resistor. The anode of the tube 34 is energized from a suitable B+ supply. The cathode of tube 34 is connected via a cathode resistor 36 to ground and a capacitor 37 is connected between ground potential and the control electrode of the electron tube. Again capacitor 37 and resistor 35 form the R-C integrating circuit and the rates of change of voltage appearing on terminals 38 and 39, across the cathode resistor 36, are adjusted by moving the slidable contact of the variable resistor 32.

Figure 6:
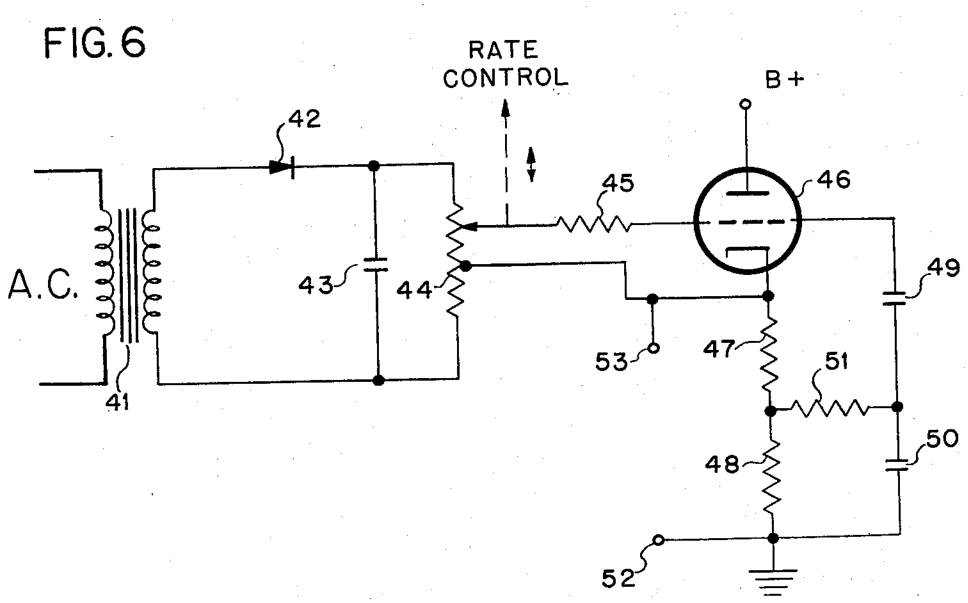
Figure 6 is a schematic circuit diagram of the integration circuit including a rectifier supply and grid to cathode bias compensation.

Figure 6 shows the controllable voltage integration circuit with rectification and isolation from a supply of A.-C. power and with grid to cathode bias compensation. Numeral 41 represents a transformer which has a primary winding and an isolated secondary winding so that the secondary winding may assume varying voltage levels with respect to the primary winding. The secondary winding of transformer 41 is connected serially to a rectifier 42 and filter capacitor 43, thereby applying D.-C. potential across the variable resistor 44 (potentiometer). The slidable contact of resistor 44 is connected via a resistor 45 to the control electrode of electron tube 46 which with its associated circuit elements forms the cathode follower circuit. The anode of electron tube 46 is energized from a suitable B+ supply. The center tap of the variable resistor is connected directly to the cathode of tube 46. The output of the cathode follower tube comprises a network of two resistors, 47 and 48, serially connected from the cathode to ground potential. A network of capacitors 49 and 50, serially connected, will be found between ground potential and the control electrode of electron tube 46. Finally, a resistor 51 is connected between the junction of the two cathode resistors and the junction of the two capacitors. When changing the position of the slidable contact of resistor 44, varying linear rates of change of voltage will appear between terminals 52 and 53, the output of the cathode follower circuit.

The operation of the device can be understood from the following description. By means of transformer 41, rectifier 42, and filter capacitor 43, a D.-C. energizing voltage is applied across variable resistor 44. Capacitors 49 and 50 act as integrating capacitors and are energized via resistor 45. The rate of rise or decline of the voltage is determined by the setting of the rate control adjustment, the position of the slidable contact of resistor 44. by virtue of the action of the cathode follower, the voltage level of the excitation network comprising transformer 41, rectifier 42, filter capacitor 43, and resistor 44 will rise and fall with the voltage existing across capacitors 49 and 50 thereby maintaining constant charging voltage except for errors introduced due to the change in the grid to cathode bias voltage at the cathode follower. This bias error is compensated by providing a circuit arrangement which consists of resistor 51 in conjunction with series connected integration capacitors 49 and 50. Resistor 51 is connected with relation to resistors 47 and 48 in such a manner that a small charging current is applied to the junction between capacitors 49 and 50. As the integration voltage rises the charging voltage across resistor 51 increases and compensates for a decreasing charging voltage at variable resistor 44 which is caused by a decrease in the bias voltage between the grid and cathode of tube 46. It will be apparent that resistors 47 and 48 may comprise a potentiometer, the sliding contact of the potentiometer being connected to resistor 51.

It will be apparent also that the fixed tap of the variable resistor must not necessarily be a center tap. If this tap is off center, the rates of rise or decline will not be symmetric relative to zero rate, but will be larger in one direction than in the other one. This arrangement may be desirable in certain conditions or applications.

While there have been described certain embodiments of the present invention it will be understood that many modifications may be made without departing from the principle of the present invention which shall be limited only by the scope of the appended claims.

What is claimed is:

1. A controllable voltage integration circuit comprising; a source of unidirectional potential; a variable resistor connected across said source, said resistor including an adjustable contact and a tap; a cathode follower circuit including an electron tube which has an anode, a control electrode and a cathode; the control electrode of said tube serially connected with a resistor to the adjustable contact of said resistor; the tap of said resistor connected to the cathode of said tube; one end of another resistor connected to the cathode of said tube, and a capacitor connected from the other end of said latter resistor to the control electrode of said tube.

2. A controllable voltage integration circuit comprising; a source of unidirectional potential; an adjustable resistor connected across said source, said resistor including an adjustable contact and a center tap; an electron tube including an anode, a control electrode and a cathode; the anode of said tube connected to a source of positive potential; a resistor connected from the cathode of said tube to ground potential; another resistor connected between the control electrode of said tube and the adjustable contact of said adjustable resistor; the center tap of said adjustable resistor connected to the cathode of said tube; a capacitor connected from the control electrode of said tube to ground potential, and means to change the setting of the adjustable contact thereby obtaining a linear rate of change of voltage across the resistor serially connected from said cathode to ground.

3. A controllable voltage integration circuit comprising; a transformer having a primary winding and an isolated secondary winding; rectifying means connected to said secondary winding; a variable resistor having a fixed contact and an adjustable contact connected to said rectifying means for obtaining a unidirectional potential therefrom; an electron tube including an anode, a control electrode and a cathode; the anode of said tube connected to a source of positive potential; a resistor connected between the control electrode of said tube and said adjustable contact; the fixed contact of said resistor connected to the cathode of said tube; one end of a resistance means connected to said cathode; a plurality of serially connected capacitors connected between the other end of said resistor means and said control electrode of said tube, and a resistor connected between said capacitors and said resistance means.

4. A controllable voltage integration circuit comprising; a transformer having a primary winding and an isolated secondary winding; rectifying and filtering means connected to said secondary winding; a variable resistor having a center tap and an adjustable contact connected to said rectifying and filtering means for obtaining a direct current potential therefrom; an electron tube including an anode, a control electrode and a cathode; the anode of said tube connected to a source of positive potential; a resistor connected from the control electrode of said tube to said adjustable contact; the center tap of said variable resistor connected to the cathode of said tube; one end of a resistance means connected from said cathode to ground potential; a network of at least two capacitors in series connected from ground potential to said control electrode; a resistor connected from the junction of said two capacitors in series to a tap of said resistance means whereby this resistor causes a relatively small charging current to be applied to said capacitor network, and an output circuit connected between said cathode and ground potential.

5. A controllable voltage integration circuit comprising; a source of unidirectional voltage having a set of output terminals; a first resistor connected between the output terminals of said source of unidirectional voltage; a cathode follower circuit including an electron tube which has an anode, a control electrode and a cathode; the control electrode of said tube serially connected with a second resistor to said first resistor and receiving via said second resistor an adjustable voltage; the cathode of said tube connected to said first resistor and connected also in series with a third resistor, and a capacitor connected from said control electrode in series with said third resistor to the cathode of said tube whereby said second resistor and said capacitor form an integrating network.

(References on following page)

References Cited in the file of this patent

UNITED STATES PATENTS

| | | |
|---|---|---|
| 2,171,625 | Dickert | Sept. 5, 1939 |
| 2,449,035 | Coffin et al. | Sept. 7, 1948 |
| 2,505,549 | Jones | Apr. 25, 1950 |
| 2,687,474 | Richmond | Aug. 24, 1954 |
| 2,697,168 | Spaulding | Dec. 14, 1954 |
| 2,704,326 | Whitson et al. | Mar. 15, 1955 |

FOREIGN PATENTS

| | | |
|---|---|---|
| 566,200 | Great Britain | Dec. 19, 1944 |